(12) United States Patent
Armingaud

(10) Patent No.: US 6,587,032 B2
(45) Date of Patent: Jul. 1, 2003

(54) SYSTEM AND METHOD FOR CONTROLLING ACCESS TO A COMPUTER RESOURCE

(75) Inventor: Francois-Dominique Gilles Armingaud, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/994,275

(22) Filed: Nov. 26, 2001

(65) Prior Publication Data

US 2002/0108046 A1 Aug. 8, 2002

(30) Foreign Application Priority Data

Nov. 28, 2000 (EP) .......................................... 00480107

(51) Int. Cl.[7] ................................................. H04Q 5/22
(52) U.S. Cl. ................... 340/5.31; 340/5.27; 340/5.28; 340/5.54; 340/5.74; 340/5.85
(58) Field of Search ........................... 340/825.56, 540, 340/576, 5.28, 5.31, 5.54, 5.74, 5.27, 5.85

(56) References Cited

U.S. PATENT DOCUMENTS

| 4,812,841 A | * | 3/1989 | Chen ..................... 340/825.31 |
| 5,559,505 A | * | 9/1996 | McNair ................. 340/825.31 |
| 5,699,514 A | * | 12/1997 | Durinovic-Johri et al. ....... 340/825.31 |
| 5,937,346 A | * | 8/1999 | Ono ...................... 340/825.31 |

\* cited by examiner

*Primary Examiner*—Daniel J. Wu
*Assistant Examiner*—Hung Nguyen
(74) *Attorney, Agent, or Firm*—William A. Kinnaman, Jr.

(57) ABSTRACT

A stealth system and method that allows a resource to be practically invulnerable to fast online brute-force attacks is disclosed. The method for controlling access to a computer resource consists in performing a user authentication procedure upon receiving a request from a user to access the computer resource. As part of the user authentication procedure, a password verification procedure is performed which comprises the steps of requesting a password from the user and comparing the entered password with an expected valid one. The next steps are to compute the number of ungranted access for the user during a predefined time interval N if the password matches the expected one and to grant access to the user only if the computed number is lower than a predetermined number K of authorized requests. Otherwise, if either the password does not match the expected one or the number of unsuccessful attempts to log is higher than the predetermined number, the access is denied to the user and a time stamp of the ungranted access is stored.

17 Claims, 2 Drawing Sheets

SYSTEM AND METHOD FOR CONTROLLING ACCESS TO A COMPUTER RESOURCE

BACKGROUND OF THE INVENTION

1. Field of the Invention

The present invention relates to computer security and more particularly to an undetectable system and method for preventing unauthorized access to a computer resource, even when the right password is supplied by chance.

2. Background of the Invention

Passwords have been used for more than 40 years to restrict access to certain computer operations by a set of given authorized users. However, with the generalization of the World Wide Web and the Internet connections, it becomes frequent for a home site to be probed by hackers 3 or 4 times a day. A well-known site may be probed more than 1000 times a day. While there are 456,976 possible 6-letter passwords if only alphabetic characters in the same case are used, trying 1000 passwords a day on each of 1000 accounts would give statistically in such a case a reasonable chance to crack one password on one account every day.

In order to prevent a hacker from trying all possible passwords at computer speed, two measures are generally used, either separately or in conjunction:

1. Locking the user's account when more than N incorrect passwords have been supplied. Only a system administrator will then be able to unlock the account once it is locked.
2. Increasing the system response delay for a user every time an incorrect password is given for that user. It is worth noting that if the delay is initially set to 1 second and doubled for every invalid attempt, the delay will be of 4,096 seconds, more than one hour, after the 12th invalid password has been supplied, which is an unbearable time for the average hacker.

But both these solutions have drawbacks, because they stay in effect after the attack is over. This allows the hacker a very easy way to induce a denial of service by saturating the system's wrong password tolerance threshold while not saturating the machine. As for example, a disgruntled employee or ex-employee could efficiently and repeatedly paralyze a whole service in a matter of minutes if he knows the list of user IDs of his ex-colleagues.

U.S. Pat. No. 5,559,505 issued to McNair E. Bruce on Sep. 24, 1996 and entitled "Security system providing lockout for invalid access attempts" discloses a system for controlling access to a resource to operate such that when an attempt to access a resource using a password fails, the time interval that must elapse before a subsequent attempt at access can be successful is incremented. And by making the increments increasingly large, repeated access attempts by hackers or unauthorized users is discouraged. This solution offers an enhancement to previous point 2 by also decreasing in relatively small decrements the wait time for each successful password. Such approach aims to be "a better compromise between access control and denial" as mentioned in the description.

However, none of the prior art techniques teach, claim or even suggest a method where no information whatsoever would be provided by the system to the hacker. Such a "silent" method, in complete opposition with previous approaches, should not provide any information useful for a hacker to detect the right password, even by a careful analysis of response times. Ideally, even a careful analysis by the hacker of unsuccessfully used passwords should be useless; indeed, the method will be the most perfect if even the right password has the most chance to be crossed out by the hacker as being invalid, and thus not to be tried by him/her anymore.

Accordingly, what is needed is a new and utterly different method which eliminates the aforementioned problems and implements a stealth solution.

SUMMARY OF THE INVENTION

One object of the present invention is to provide a method allowing a resource to be practically invulnerable to fast online brute-force attacks. The resource may be any file server, data base, computing resource, Web server or any other resource using a password protection scheme, either alone or in conjunction with other protection methods.

Another object of the invention is to deprive a hacker of any information required in order to make an efficient so-called "slow attack". A "slow attack" tries only the maximum number of allowed passwords minus one, but does it every day for every known user ID, many weeks in sequence.

Still another object of the present invention to offer a stealth protection method which prevents an unauthorized user from discovering that the right password has been tried, or even that a protection system other than the password is present.

It is yet another object of the invention to provide a method wherein neither the hacker nor the user will be slowed down. Moreover, security is even based on the fact that the attacker will make his attempts at the fastest speed he can, whether or not consistent with the idea that the real user is trying to log on, for instance through the use of a program trying different passwords at computer speed. In fact, the faster his attempts, the better the security and the greater the probability that he will be denied access, even when, by pure chance, he is using the right password, and will never know that he is using the right password.

In a preferred embodiment, a method for controlling access to a computer resource consists in performing a user authentication procedure upon receiving a request from a user to access the computer resource. As part of the user authentication procedure, a password verification procedure is performed which comprises the steps of requesting a password from the user and comparing the entered password to an expected valid one. The next steps are to check the number of rejected access attempts for that user during a predefined time interval N if the given password matches the expected one and to grant access to the user only if the computed number is lower than a predetermined number K of authorized requests. Otherwise, if either the password does not match the expected one or the number of unsuccessful attempts to log is higher than the predetermined number, access is denied to the user and a new time stamp of the ungranted access is stored.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

The method of the present invention may be summarized as follows: a sliding time window is first chosen having a size N preferably expressed in seconds, and a number K of acceptable logon attempts within this sliding window is determined. In a preferred embodiment N is equal to 3600 seconds and K is equal to 3.

Any attempt to log in more than K times within the sliding window will result for the user (authorized or not) in a received message of the type "INVALID PASSWORD", even if the right password has been supplied. It is a main point of this invention that the hacker gets exactly the same message whether the password is right or wrong. In that way, he will normally cross out that password in his list in order to never try it again.

To complete this fundamental idea, one has to make sure that the hacker will never have any opportunity to try all possible passwords. If the typical size of a password is 6 case-sensitive alphanumeric characters, one has to make sure that there will be no way to try all the corresponding passwords ($62^6$=about 56 billion) in a typical maximum reasonable password lifetime (say one year). Thus, 56 billion divided by 365 days of 24 hours would mean a rate of 1800 passwords per second, which is a very unlikely value for a human user. However, such unlikely attempts can be discouraged by either of the following techniques:

1. Requiring a minimum delay between two attempts, the minimum delay being compatible with human operation (two seconds for example), and rejecting his attempt otherwise. While being quite plausible in any context, this kind of message does not give the hacker any hint about the scheme used by the present invention.
2. Enforcing a minimum delay (a two-second delay) plus or minus a random time by a programmed delay in the system, which can create the illusion that such a time is a consequence of system load. Here again, no hint is given to the hacker about the proposed scheme.

The minimum delay is an option to ensure that the hacker will never have a chance to try all the passwords and thereby guess the method of the invention. However, the primary point is that in the given sliding window condition, even using the valid password results in an "INVALID PASSWORD" type error message.

While a 2-second delay is quite acceptable for manual connections, it may be considered excessive for frequent automated operations when the context does not suggest that any attack is in progress and/or in a context where the sensitivity of data is classified as medium. In such a case, one can consider activating the 2-second (or any other value) delay only in an identified attack context. This will be described in detail below.

Figure 1:
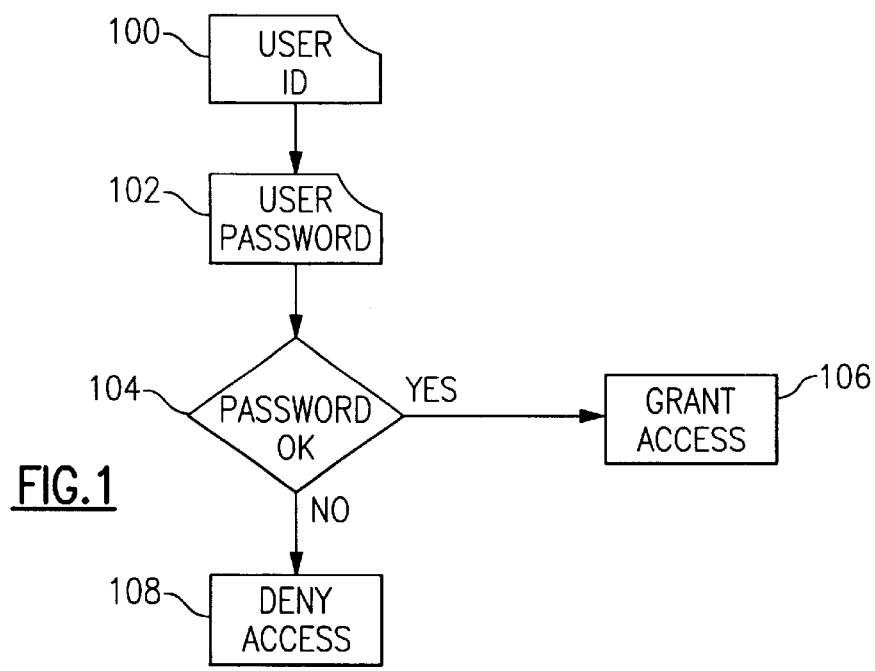
FIG. 1 is a flow chart of a prior art login sequence.

Referring now to FIG. 1, a basic general process for a user wanting to log a resource is shown.

In a first step 100, the system asks for the user's name or ID. On some systems, such as VM/CMS or TSO ones, the existence of this name is checked immediately. On other systems, like the UNIX family, this verification is deferred until the password has been entered. The present method is not linked to any particular condition of this verification.

In step 102, the system asks for the user's password. Generally this sequence is not echoed, or not echoed as typed, for security reasons.

In the next step 104, the system checks that the right password has been typed for that user if this user exists.

If the match is OK (branch YES) access is granted in step 106.

Otherwise, in step 108 the access is denied. Some systems will increase a counter in such a case allow locking the account should too many invalid logons be attempted.

Figure 2:
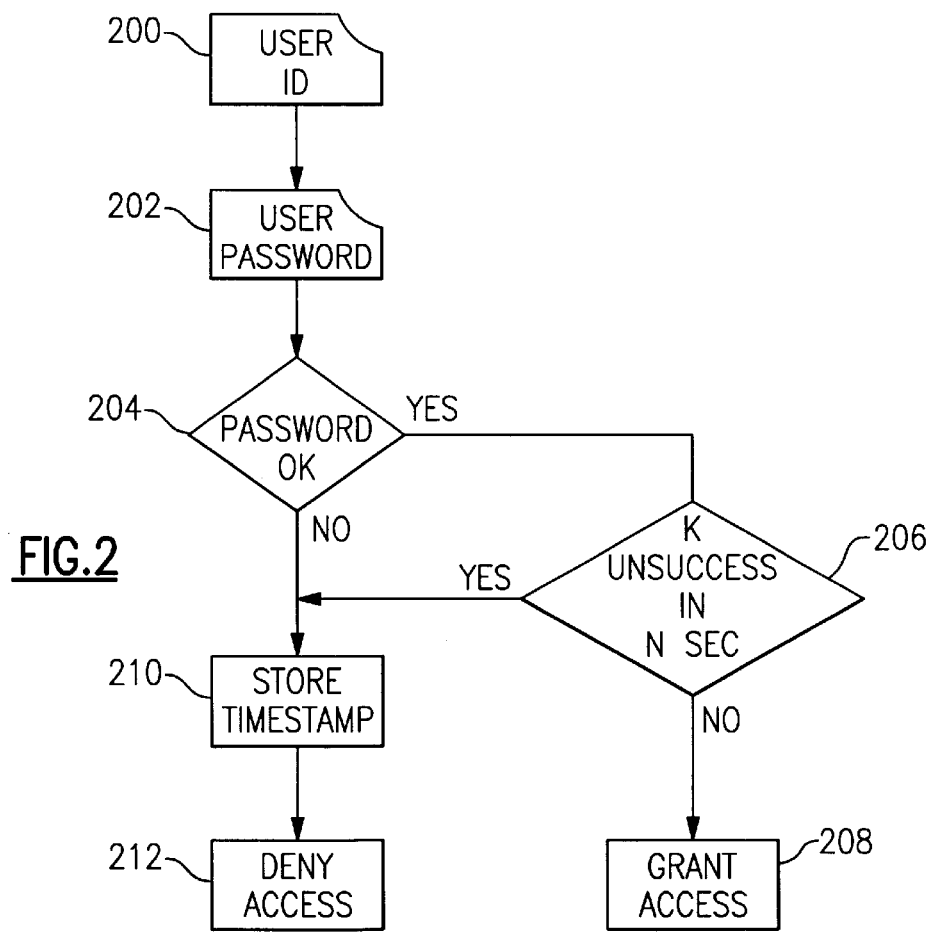
FIG. 2 is a flow chart of the login sequence of the present invention.

Referring now to FIG. 2, the process of the present invention is now described.

In a first step 200, the system asks a user willing to access a resource to type his user name or ID. The user here can be either a human user or a client computer (in which case the "user name" may refer to a class of service rather than to a given computer ID).

In the next step 202, the system asks for the user's password. This password may be seen as a given sequence of ASCII characters, printable or not. It will be either stored in a memory part of the solicited resource computer or computed from a random string issued by that computer together with the logon prompt (a "challenge/response" password).

In the next step 204, the system checks if the password matches an expected sequence. This operation is not detailed here as it is not required for the understanding of the present invention, but the skilled artisan could refer to any known method, such as simply comparing the entered password with an existing list of valid passwords.

If the password does not match the expected sequence (branch NO), the process enters step 210, which is detailed hereinbelow.

If the password matches the expected sequence (branch YES), a test is performed in step 206 to determine if more than K unsuccessful logons were attempted during the N last seconds. It is readily obvious that any other time unit can be used, but second is generally the one used.

If no more than K unsuccessful logons were attempted during the N last seconds, access is granted in step 208. Nevertheless, the user will never be aware of the existence of the test performed in step 206.

If at least K unsuccessful logons were attempted during the last N seconds (branch YES of step 206), then the system operates exactly the same as if the password did not match (branch NO of step 204) and the process enters step 210. It is important to note that this is a core point of the present invention, and the one which makes this method a really "stealth" one.

In step 210, whether as a result of step 204 (branch NO) or of step 206 (branch YES), a time stamp is stored in a data structure of the resource computer able to store K latest unsuccessful logon attempts. In a preferred implementation, a circular buffer is used as the memory structure, but the skilled artisan may easily devise another type of predefined class depending on which programming language is used.

As already explained, in another embodiment, the method may be enforced by the addition of a security delay. Depending on the relative importance of operational performance vs. the desired "stealthness", the security delay can be applied:

1. both for branch NO of step 204 and branch YES of step 206, which reflects a maximum stealthness with a slightly reduced performance;
2. only for branch YES of step 206, which reflect a maximum performance with a slightly reduced stealthness; or
3. at the next logon time by permuting steps 204 and 206 in order to achieve both a maximum stealthness and a maximum performance when no attack is in progress. However, this option is at the expense of some extra programming to implement it in the existing logon procedures.

Finally, in step 212, access is denied with the very same error message as if the match had failed in step 204.

Figure 3:
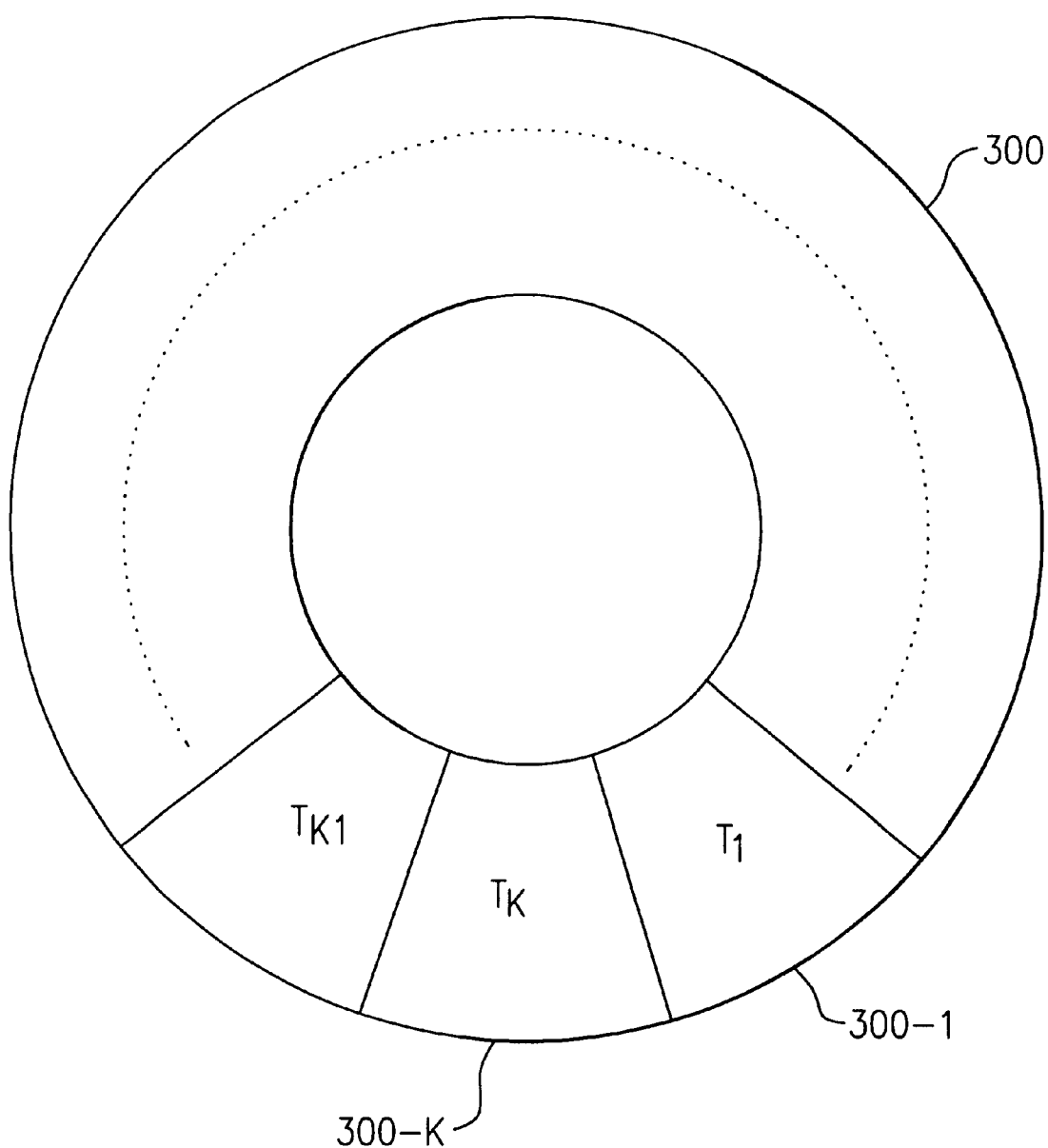
FIG. 3 shows a preferred implementation of a time stamp memory structure of the present invention.

FIG. 3 illustrates a preferred implementation of a data structure 300 to store the time stamp list of a given user. The memory 300 is a circular buffer comprising a set of at least K memory cells 300-1 to 300-K, each of which contains a time stamp $T_1$ to $T_K$. The process of the invention needs to access efficiently the Kth oldest time stamp $T_K$ at each logon, as well as to insert the current time stamp $T_1$ as being the most recent one at each failed logon. The insertion of the present time stamp shifts all the others except the Kth one which is deleted.

In the preferred implementation, K is chosen to be a power of 2; in that case, a contiguous block of memory is sufficient and the "circular linking" between the memory cells is implemented by incrementing an offset and applying a binary mask to it. However, if K is not a power of 2, the binary mask can be replaced by an arithmetic modulus (mod K) operation. Alternately, a circular list may also be used.

What is claimed is:

1. A method for controlling access to a computer resource upon receiving a current request from a user to access the resource, comprising the steps of:

receiving a password from the user;

comparing the received password with an expected valid password;

if the passwords match, granting access to the user only if the number of ungranted requests for the user within a sliding window of predetermined duration immediately preceding the current request is lower than a predetermined number of unauthorized requests, otherwise, denying access to the user and storing a time stamp of the denied access; and if the passwords do not match, denying access to the user and storing a time stamp of the denied access.

2. The method of claim 1 wherein access is granted to the user after receiving a password from the user.

3. The method of claim 1 wherein the user is a client computer and the computer resource is a server computer.

4. The method of claim 3 wherein the computer resource is a Web server.

5. The method of claim 1 wherein the step of computing the number of ungranted requests is performed before the step of comparing the received password.

6. The method of claim 1 wherein the predetermined number of unauthorized requests is a power of 2.

7. The method of claim 1 wherein the steps are repeated for a subsequent request after access is denied to the user.

8. The method of claim 7 wherein the steps are repeated after a predetermined delay.

9. The method of claim 8 wherein the predetermined delay is equal to 2 seconds.

10. A system for controlling access to a computer resource upon receiving a current request from a user to access the resource, comprising:

means receiving a password from the user;

means for comparing the received password with an expected valid password;

means for granting access to the user only if the number of ungranted requests for the user within a sliding window of predetermined duration immediately preceding the current request is lower than a predetermined number of unauthorized requests, otherwise, denying access to the user and storing a time stamp of the denied access, if the passwords match; and means for denying access to the user and storing a time stamp of the denied access if the passwords do not match.

11. A computer-readable medium comprising instructions for carrying out the steps of a method for controlling access to a computer resource upon receiving a current request from a user to access the resource, the method steps comprising:

receiving a password from the user;

comparing the received password with an expected valid password;

if the passwords match, granting access to the user only if the number ungranted requests for the user within a sliding window of predetermined duration immediately preceding the current request is lower than a predetermined number of unauthorized requests, otherwise, denying access to the user and storing a time stamp of the denied access; and if the passwords do not match, denying access to the user and storing a time stamp of the denied access.

12. The method of claim 1, comprising the step of storing time stamps for said predetermined number of most recent ungranted requests, said step of granting access comprises the step of examining the oldest such time stamp to determine whether it is within said sliding window.

13. The method of claim 12 in which said time stamps are stored in a circular buffer.

14. The system of claim 10, comprising means for storing time stamps for said predetermined number of most recent ungranted requests, said means for granting access examining the oldest such time stamp to determine whether it is within said sliding window.

15. The system of claim 14 in which said means for storing said time stamps comprises a circular buffer.

16. The computer-readable medium of claim 11, said method steps comprising the step of storing time stamps for said predetermined number of most recent ungranted requests, said step of granting access comprises the step of examining the oldest such time stamp to determine whether it is within said sliding window.

17. The computer-readable medium of claim 16 in which said time stamps are stored in a circular buffer.

* * * * *